(12) United States Patent
Zepeniuk et al.

(10) Patent No.: US 10,739,952 B2
(45) Date of Patent: Aug. 11, 2020

(54) MULTIPLE SENSORS PROCESSING SYSTEM FOR NATURAL USER INTERFACE APPLICATIONS

(71) Applicant: INUITIVE LTD, Ra'anana (IL)

(72) Inventors: Dor Zepeniuk, Kfar Hess (IL); Shlomo Gadot, Hertzliya (IL)

(73) Assignee: INUITIVE LTD., Ra'anana (IL)

( * ) Notice: Subject to any disclaimer, the term of this patent is extended or adjusted under 35 U.S.C. 154(b) by 1164 days.

(21) Appl. No.: 14/418,085

(22) PCT Filed: Jul. 31, 2013

(86) PCT No.: PCT/IL2013/050650
§ 371 (c)(1),
(2) Date: Jan. 29, 2015

(87) PCT Pub. No.: WO2014/020604
PCT Pub. Date: Feb. 6, 2014

(65) Prior Publication Data
US 2015/0154035 A1 Jun. 4, 2015

Related U.S. Application Data

(60) Provisional application No. 61/677,563, filed on Jul. 31, 2012.

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 3/038* (2013.01); *G06F 9/451* (2018.02); *G06F 2203/0381* (2013.01)

(58) Field of Classification Search
CPC ... G06F 9/451; G06F 3/038; G06F 2203/0381
See application file for complete search history.

(56) References Cited

U.S. PATENT DOCUMENTS 7,796,155 B1 * 9/2010 Neely, III .......... G06K 9/00771
345/418
8,138,975 B2 * 3/2012 Bull ...................... G01S 5/0215
342/450

(Continued)

OTHER PUBLICATIONS

International Search Report for International Application No. PCT/IL2013/050650 dated Nov. 18, 2013.

*Primary Examiner* — Haoshian Shih
(74) *Attorney, Agent, or Firm* — Pearl Cohen Zedek Latzer Baratz LLP

(57) ABSTRACT

A system and a method on an integrated circuit are provided herein. The system may include: a plurality of defined data processing dedicated areas to perform computational functions relating to a corresponding plurality of natural user interface features, to obtain the plurality of user interface features based on scene features detected by a plurality of sensors within a defined period of time; a central processing unit configured to carry out software instructions to support the computational functions of the dedicated areas; and at least one defined area for synchronized data management, to receive signals corresponding to detected scene features from the plurality of sensors and to route the signals to suitable dedicated areas of the plurality of dedicated areas to provide real-time acquiring of user interface features.

19 Claims, 7 Drawing Sheets

(51) Int. Cl.
    *G06F 3/038*     (2013.01)
    *G06F 9/451*     (2018.01)

(56) References Cited

U.S. PATENT DOCUMENTS

| | | |
|---|---|---|
| 2010/0007717 A1 | 1/2010 | Spektor et al. |
| 2010/0106449 A1 | 4/2010 | Kalb et al. |
| 2012/0056982 A1 | 3/2012 | Katz et al. |
| 2014/0028548 A1* | 1/2014 | Bychkov ................ G06F 3/013 345/156 |

* cited by examiner

MULTIPLE SENSORS PROCESSING SYSTEM FOR NATURAL USER INTERFACE APPLICATIONS

CROSS-REFERENCE TO RELATED APPLICATIONS

This application is a National Phase Application of PCT International Application No. PCT/IL2013/050650, International Filing Date Jul. 31, 2013, claiming priority of U.S. Provisional Patent Application No. 61/677,563, filed Jul. 31, 2012 which is hereby incorporated by reference.

BACKGROUND

1. Technical Field

The present invention relates generally to signal processing systems, and more particularly, to signal processing systems that process signals from a plurality of sensors for user interface purposes.

2. Discussion of the Related Art

Natural user interface (NUI) has become very popular in recent years with the introduction of true experience computer games and sophisticated consumer electronic goods. Most NUI-based products provide some or all of the following NUI functionalities: gesture recognition, gaze detection, face recognition, expression recognition, speech detection, speech recognition, and depth map generation. Some of the current NUI solutions are based on the generation of a depth map of the scene which is later enhanced with optical/visible light data of the scene.

Some of the disadvantages of the currently available NUI solutions are their dependency upon the accuracy of the depth map and the data derived therefrom. It would be therefore advantageous to provide a NUI processing system that provides a holistic, multi sense solution that encompasses a broader spectrum of NUI applications.

Some of the disadvantages of currently available NUI solutions are their dependency on a single modality of information. For example one system is doing gaze tracking and one system is doing gesture recognition. Thus on certain devices you will find multiple separate systems for gaze tracking, gesture recognition, face recognition, speech recognition, etc. This leads to several problems: (1) the combined CPU requirements of all systems exceeds the device CPU power; (2) electrical power over usage; (3) each sub-system works in its own time frame and they are not synchronized, therefore they fail to interpret the true intention of the user; (4) the combined processing time of the system is too long and causes a long delay (latency) between the user action and system response. In some systems the distance between the sensor and the processing unit also induce even more latency.

BRIEF SUMMARY

Embodiments of the present invention may provide a natural user interface system and method. A natural user interface system according to embodiments of the present invention may include an integrated circuit dedicated for natural user interface processing, the integrated circuit including: a plurality of defined data processing dedicated areas to perform computational functions relating to a corresponding plurality of natural user interface features, to obtain the plurality of user interface features based on scene features detected by a plurality of sensors within a defined period of time; a central processing unit configured to carry out software instructions to support the computational functions of the dedicated areas; and at least one defined area for synchronized data management, to receive signals corresponding to detected scene features from the plurality of sensors and to route the signals to suitable dedicated areas of the plurality of dedicated areas to provide real-time acquiring of user interface features.

A natural user interface method according to embodiments of the present invention may include receiving signals generated by a plurality of sensors, the signals corresponding to scene features detected by the plurality of sensors within a defined period of time; routing the generated signals by the at least one synchronized data management area to suitable dedicated areas of the plurality of dedicated areas, to provide real-time acquiring of natural user interface features; and performing by the plurality of dedicated areas computational functions relating to a corresponding plurality of natural user interface features, to obtain the plurality of user interface features based on the detected scene features.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "depth map" as used herein refers to an image or an image channel that contains information relating to the distance of the surfaces of scene objects from a viewpoint. The term is related to and may be analogous to depth buffer, Z-buffer, Z-buffering and Z-depth, wherein the "Z" relates to a convention that the central axis of view of a camera is in the direction of the camera's Z axis, and not to the absolute Z axis of a scene. Put differently, a depth map can be any pixel-based description of the scene, in which every pixel is assigned with a spatial location within that scene.

Figure 1:
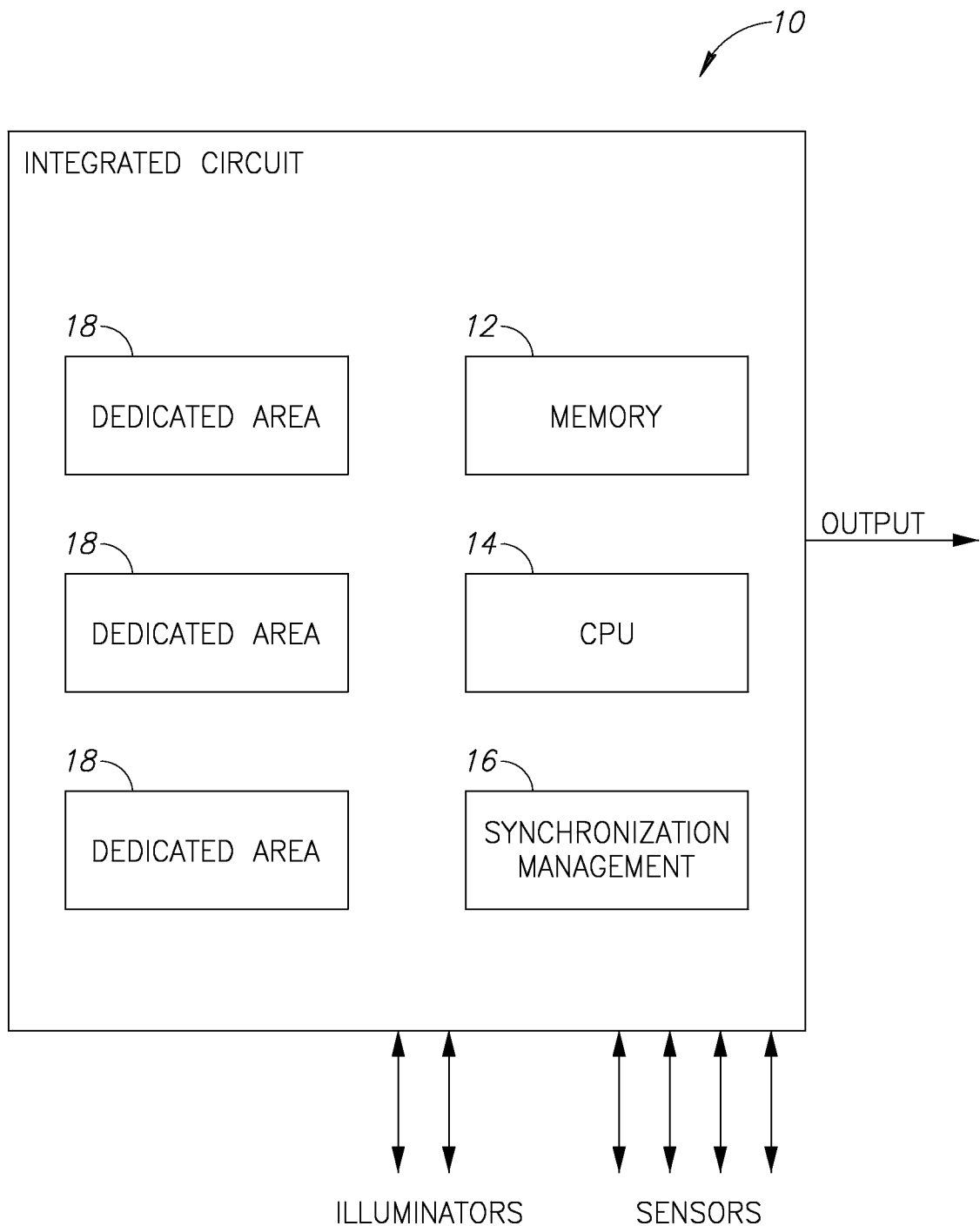
FIG. 1 is a schematic illustration of an integrated circuit dedicated for natural user interface processing according to embodiments of the present invention.

Reference is now made to FIG. 1, which is a schematic illustration of a system on an integrated circuit 10 dedicated for natural user interface processing according to embodiments of the present invention. Integrated circuit 10 may be an application specific integrated circuit (ASIC) dedicated for natural user interface processing. Integrated circuit 10 may be included in a natural user interface system which may further include a plurality of sensors and/or illuminators as described in detail herein below. Integrated circuit 10 may be embedded in a host processor and/or data may be transferred from integrated circuit 10 to the host processor to perform some of the user interface processing. Additionally data may be transferred from host processor to the integrated circuit 10 to perform some of the user interface processing or to add more information to be processed in the integrated circuit 10. Integrated circuit 10 may include a memory 12, a central processing unit (CPU) 14, at least one defined area for synchronized data management 16, and a plurality of defined data processing dedicated areas 18.

The plurality of defined data processing dedicated areas 18 may be configured to perform computational functions relating to a corresponding plurality of natural user interface features. The natural user interface features may include, for example, any action made by a user's body, through the user's body parts or by objects held, movable and/or controlled by a user, which may be detected and processed by the system according to embodiments of the present invention to produce a user interface event. For example, natural user interface feature may include a finger movement, body gesture, head movement, gaze, face changes, movement and/or change in expression, voicing, speaking, object movement and/or any other suitable natural user interface feature. Data processing dedicated areas 18 may obtain the plurality of user interface features based on scene features detected by a plurality of sensors, for example within a defined period of time, for example, a predefined or pre-known period of time such as, for example, the frame period of the imaging device or another defined period of time. The scene features may include, for example, any sensual feature that may be detected in/from a scene. For example, the scene features may include any visual feature, auditory feature, and/or features pertaining to smell, taste and/or pressure that may be detected in/from a scene. For example, the scene features may include depth, image, color, illumination, sound, and/or any other suitable feature. Central processing unit 14 may be configured to carry out software instructions to support the computational functions of dedicated areas 18. The software/computer program instructions may be stored in memory 12, which may be a non-transitory computer readable storage medium that may be read by central processing unit 14. When executed by central processing unit 14, the instructions stored and/or included in memory 12 may cause central processing unit 14 to carry out the methods disclosed herein.

A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Memory 12, according to embodiments of the present invention, may function to perform simultaneously the processing and the data collection and streaming according to the methods described herein. Memory 12 may be configured to enable simultaneous collection of data from the sensors and processing of the collected data. Memory 12 may be configured to accumulate data captured by the sensors and processed repeatedly, until a user interface feature is obtainable. Memory 12 may be configured to enable synchronization of at least two or all operations of a list comprising: sensor operation, data acquiring, obtaining of three-dimensional information and/or extraction of natural user interface features. Memory 12 may be configured to assign time tags to data transmitted through processing elements, for example in order to enable the synchronization.

Synchronized data management area 16 may be configured to receive signals corresponding to detected scene features from the plurality of sensors and/or to synchronously route the signals to the suitable dedicated areas 18, for example, to provide real-time acquiring of user interface features. The plurality of sensors may detect scene features simultaneously, periodically and/or constantly. The synchronized data management area 16 may route the signals to the suitable dedicated areas 18 and/or to central processing unit 14 in order to provide real-time acquiring of user interface features, for example according to the computational functions of the different areas 18, according to needs of the natural user interface system, according to a desired timing and/or according to optimal use of resources.

Synchronized data management area 16 may additionally synchronize the plurality of sensors to detect scene features and/or to generate corresponding signals, for example, in specific timing and/or according to specific needs of the natural user interface system. Additionally or alternatively, central processing unit 14 and/or at least one of dedicated areas 18 may be configured to individually control devices included in the plurality of sensors. Synchronized data management area 16 may further coordinate between dedicated areas 18 and central processing unit 14, to control and/or coordinate the timing of operations of dedicated areas 18 and central processing unit 14, for example in order to best utilize the computational resources of dedicated areas 18 and/or of central processing unit 14 and/or in order to provide real-time acquiring of user interface features.

Central processing unit 14 and/or at least one of dedicated areas 18 may extract user interface commands based on the obtained user interface features. Central processing unit 14 and/or at least one of dedicated areas 18 may generate events in real time in response to the extracted commands.

A system on an integrated circuit 10 and a method for natural user interface applications according to embodiments of the present invention may provide in real-time, e.g. in less than 50 msec, operations such as, for example, extraction of data, correlation between sensors inputs, acquiring of user interface features, generation of events and correlation between events and/or events interactions. For example, the system may provide reactions to events generated by the natural user interface in less than 50 msec. Embodiments of the present invention may provide a processing cycle time of at least 20 Hz. A system on an integrated circuit 10 may provide a short latency time, for example from receiving information to producing an event in response to the received information. For example, a system on an integrated circuit 10 according to embodiments of the present invention may provide a latency time of up to about 50 msec.

The user interface commands may be extracted by central processing unit 14 and/or at least one of dedicated areas 18 in real time synchronously with external information sources and/or processing activities. Central processing unit 14 and/or at least one of dedicated areas 18 may generate events in real time in response to the extracted commands. For example, a user interface command may be extracted from a head or hand movement of a user, detected by one of dedicated areas 18, and central processing unit 14 and/or at least one of dedicated areas 18 may generate an event in response to the extracted command. For example, if the command orders to select a certain virtual object, the generated event may be a selection of the certain virtual object.

The natural user interface system may include, for example, sensors to capture stereoscopic, three-dimensional and/or depth/distance data. For example, the sensors may include visible light imaging device, depth sensors, stereoscopically calibrated and/or aligned infrared capturing devices (for example, calibrated by any suitable calibration process such as, for example, Camera Calibration Toolbox for Matlab®), audio capturing device, laser scanners, time-of flight cameras, ultrasonic sensors and/or any other suitable sensor/device. For example, the sensors may include two or more infrared imaging devices configured to capture infrared stereoscopic images of the scene from at least two different spatial locations. At least one of the dedicated areas 18 may be configured to obtain three-dimensional information about the scene. At least one of dedicated areas 18 and/or central processing unit 14 may be configured to optically align and/or correlate visible light and corresponding three-dimensional information. The computational functions of the various dedicated areas 18 that relate to a plurality of natural user interface features may include, for example, finger tracking, gesture recognition, head tracking, gaze detection, face recognition, expression recognition, face reconstruction, speech detection, speech recognition, depth map generation and/or any other suitable computational function that relate to a natural user interface feature.

The natural user interface system may further include, for example, an illuminator configured to illuminate the scene at a mode of illumination determined by processing unit (CPU) 14 or at least one of the dedicated areas 18 based on level of ambient light and level of featureless surfaces in the scene as presented in captured images of the scene. Central processing unit 14 or at least one of the dedicated areas 18 may select, for example, one of following modes of illumination: a mode of no illumination, a mode of infrared flood illumination, and a mode of pattern illumination. Processing unit 14 or at least one of the dedicated areas 18 may select the mode of no illumination, for example, when the ambient light in the scene is beyond a specified threshold, the mode of infrared flood illumination, for example, when the ambient light in the scene is below the specified threshold, and the mode of pattern illumination, for example, when featureless surfaces in the scene are detected beyond a predefined level. The illuminator may include, for example, an array of infrared emitters being used with a specified optical mask, as described in detail herein below. Additionally, the system may further include, as described in detail herein below, a multi-switch setup enabling operation of only part of the array at any given moment, thus modulating the illumination.

Figure 2:
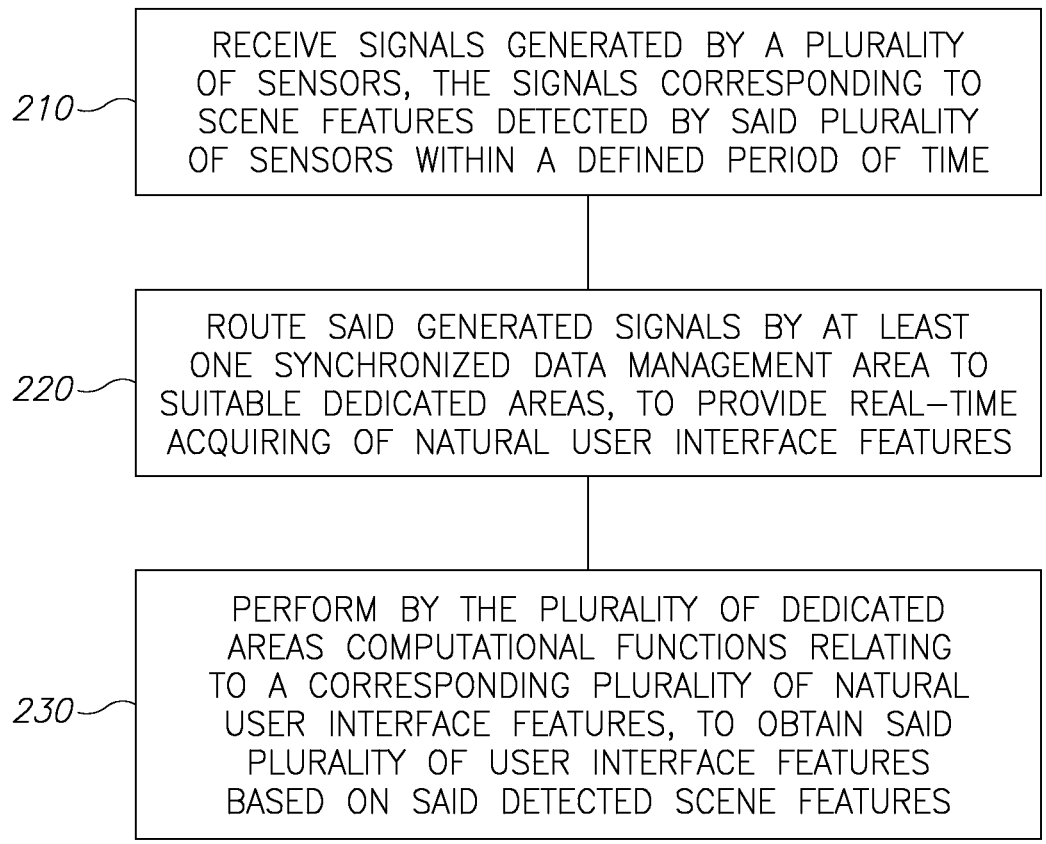
FIG. 2 is a schematic flowchart illustrating a method for natural user interface processing according to embodiments of the present invention.

Reference is now made to FIG. 2, which is a schematic flowchart illustrating a natural user interface method 200 for processing natural user interface according to embodiments of the present invention. The method may be carried out by dedicated integrated circuit 10 as described in detail herein. As indicated in block 210, the method may include receiving signals generated by a plurality of sensors, the signals corresponding to scene features detected by the plurality of sensors within a defined period of time. The receiving of scene features may include receiving from a plurality of sensors simultaneously. The method may further include synchronizing the plurality of sensors by at least one defined synchronized data management area 16. The method may further include individually controlling by processing unit 14 and/or at least one dedicated area 18 devices included in the plurality of sensors. The detection of scene features by the plurality of sensors may include capturing of infrared stereoscopic images of the scene from at least two different spatial locations by a plurality of sensors comprising two or more infrared imaging devices.

As indicated in block 220, the method may include routing the generated signals by at least one synchronized data management area 16 to suitable dedicated areas 18, to provide real-time acquiring of natural user interface features, for example as described in detail herein. In some embodiments of the present invention, the method may further include coordinating by synchronized data management 16 between the plurality of dedicated areas 18 and central processing unit 14.

As indicated in block 230, the method may include performing by the plurality of dedicated areas 18 computational functions relating to a corresponding plurality of natural user interface features, to obtain a plurality of user interface features based on the detected scene features, wherein the acquiring of user interface features by the computational functions of dedicated areas 18 may be supported by central processing unit 14, for example as described in detail herein. In some embodiments of the present invention, the performing of computational functions may include obtaining three-dimensional information about the scene. The method may further include optically aligning and/or correlating visible light and corresponding three-dimensional information by at least one of dedicated areas 18 and/or central processing unit 10.

In some embodiments of the present invention, the method may further include transferring data from integrated circuit 10 to a host processor to perform some of the user interface processing.

In some embodiments of the present invention, the method may further include extracting user interface commands based on the user interface features by at least one of the dedicated areas 18 and/or central processing unit 14, for example in real time and/or synchronously with external information sources and/or processing activities. The method may further include generating events by central processing unit 14 in real time in response to the extracted commands.

In some embodiments of the present invention, the method may further include illuminating the scene at a mode of illumination determined by processing unit 14 and or a dedicated area 18, for example as described in detail herein. The method may further include modulating the illumination by operating only part of the illumination emitters array at any given moment, for example as described in detail herein.

Figure 3:
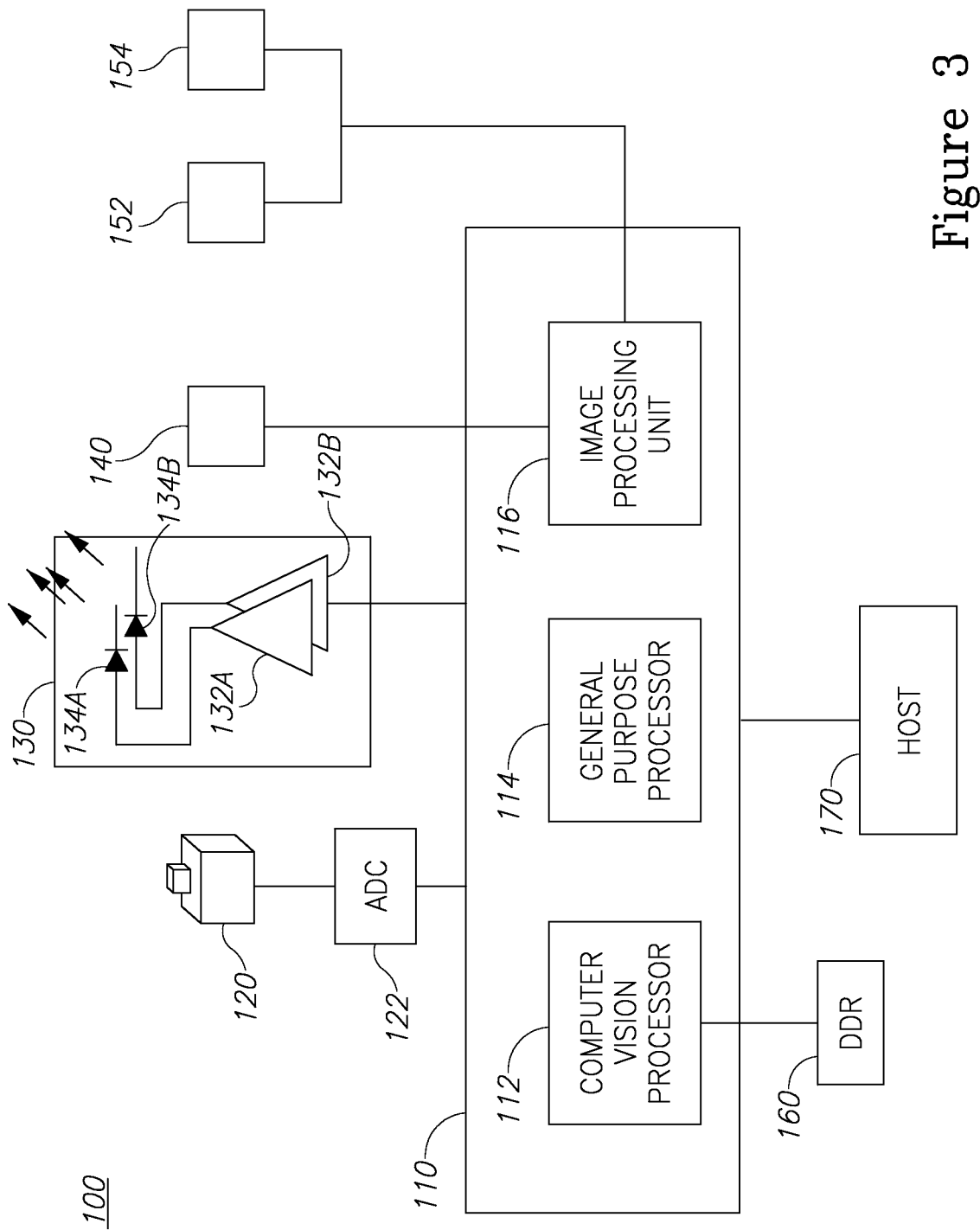
FIG. 3 is a high level schematic block diagram illustrating an exemplary system according to some embodiments of the invention.

FIG. 3 is a high level schematic block diagram illustrating an exemplary natural user interface (NUI) system 100 according to some embodiments of the invention. System 100 may include, for example, a processing unit 110 that may be implemented as an integrated circuit 10 as describe in detail with reference to FIGS. 1 and 2. System 100 may further include, for example, one or more illuminators 130, and a plurality of sensors comprising at least one visible light capturing device 140 and additional depth sensors that may capture stereoscopic, three-dimensional and/or depth/distance data. The depth sensors may include, for example, two or more infrared imaging devices configured to capture infrared stereoscopic images of a scene from at least two different spatial locations. Such depth sensors may include, for example, stereoscopically aligned infra red (IR) capturing devices 152 and 154, and optionally at least one audio capturing device 120 configured to capture audio from the scene surroundings. In other embodiments, system 100 may include other or additional sensors for capturing three-dimensional or stereoscopic data such as, for example, laser scanners, time-of flight cameras, ultrasonic sensors and/or any other suitable sensor/device.

Visible light capturing device 140 may be, for example, an RGB camera such as a standard webcam. Visible light capturing device 140 may be configured to capture optical images of the scene. The visible light capturing device 140 may be part of the depth sensors which additionally to providing three-dimensional and/or depth/distance data of the scene may provide optical images of the scene. For example, a stereoscopic imaging that uses sensors at the visible spectrum range.

Stereoscopically aligned infra red (IR) capturing devices 152 and 154 may be configured to capture infrared images of the scene, for example based on a specified pattern. IR capturing devices 152 and 154 may be configured to capture infrared stereoscopic images of a scene from at least two different spatial locations.

Processing unit 110 may individually control and/or be electronically coupled to: visible light capturing device 140, illuminators 130, stereoscopically aligned infra red (IR) capturing devices 152 and 154, and audio capturing devices 120 possibly via respective analog to digital converters 122.

Visible light capturing device 140, infra red (IR) capturing devices 152 and 154 and possibly additional devices and/or sensors my be controlled by processing unit 110 to operate periodically and/or to capture data within predefined periods of time, for example at least one visible light image of a scene and stereoscopic data on the same scene in a predefined period of time. The visible light image and stereoscopic data may be captured simultaneously or alternately within the predefined period of time.

Processing unit 110 may include an autonomous processing unit for natural user interface processing. Processing unit 110 may be implemented as a single integrated circuit 10 as describe in detail with reference to FIGS. 1 and 2. For example, processing unit 110 may include the following modules that may be executed by separate dedicated areas 18 and/or by CPU 14 on integrated circuit 10: a computer vision processor 112, a general purpose processor 114, and an image signal processor 116. Processing unit 110 may be further electronically coupled and/or embedded with an external memory unit such as Double Data Rate Synchronous Dynamic Random Access Memory (DDR-SDRAM) 160 and with a host processor 170 which may be any computerized system that may require NUI functionalities.

The autonomous processing unit 110 may be embedded in host processor 170 and data may be transferred from processing unit 110 to host processor 170 to perform some of the user interface processing at the host processor 170. In operation, processing unit 110 is configured to simultaneously process the captured optical images, the captured stereoscopic data, such as the IR images, and possibly audio of the scene using image signal processor 116 and general purpose processor 114.

For example, processing unit 110 may receive depth information from at least one depth sensor such as, for example, IR capturing devices 152 and 154, and visual information from visible light capturing device 140. Based on the depth and visual information, processing unit 110 may obtain three-dimensional information about the scene such as, for example, natural user interface features, by NUI functionalities of computer vision processor 112, including, for example, finger tracking, gesture recognition, head tracking, gaze detection, face recognition, expression recognition, face reconstruction, speech detection, speech recognition, depth map generation and/or other NUI-related properties.

By the NUI functionalities of computer vision processor 112, processing unit 110 may extract user interface commands based on the three dimensional information, by detecting and monitoring changes in NUI features such as, for example, a user's three dimensional head pose, a user's face features (eyes, nose, mouth, ears, etc.), a user's gaze direction in two or three dimensions, a user's fingers location and orientation in three dimensions, a user's skin color, a user's breathing rate, a user's heart-bit rate and/or any other suitable NUI feature. Accordingly, processing unit 110, with or without the cooperation of host processor 170, may extract user interface commands based on the three dimensional information and generate events in real time in response to the extracted commands. The processing of data received from the sensors, the extracting of commands and/or the generating of events may be performed by processing unit 110 simultaneously by using the various modules of processing unit 110. Therefore, the extraction of user interface commands may be performed in real time and synchronously with external information sources and/or processing activities.

In some non limiting embodiments, IR capturing devices 152 and 154 as well as visible light capturing device 140 may be implemented using standard CMOS or CCD cameras technology, where the IR cut filter is removed or modified. Removal of the IR cut filter results enhanced IR sensitivity of the cameras. Those cameras, in addition to their RGB sensitivity, are also sensitive to IR light. The IR sensitivity is utilized for two purposes: (a) when visible ambient light is low, high bright IR emitters are activated. IR flooding of the scene improves cameras Signal-to Noise output ratio; and (b) in some cases, IR pattern projection of the scene can be helpful for the depth map algorithm.

Visible light capturing device 140 which can be implemented as a standard RGB camera and may route its data via a USB3.0 port associated with processing unit 110. The data may be processed and enhanced, utilizing processing unit 110.

Illuminator 130 may be configured to illuminate the scene at a mode of illumination determined by processing unit 110 based on level of ambient light and level of flat surfaces in the scene as presented in the captured images. The determined mode of operation may be, for example, one of the following three modes of illumination: no illumination, IR flood illumination, and IR pattern illumination. Illuminator 130 may be possibly implemented as two arrays of IR emitters 134A and 134B each controlled by its current source 132A and 132B respectively. IR emitters 134A may be operable to illuminate the scene with flood light, for example, while IR emitters 134B may be operable to illuminate the scene with patterned light.

Processing unit 110 may select the mode of no illumination when the ambient light in the scene is beyond a specified threshold. In this mode, ambient visible light level is sufficient for both visible light and IR quality pictures and in addition, for example, there are no featureless surfaces present at the scene (or alternatively, amount of featureless surface is below a predefined threshold). In this mode, no additional illumination is required and/or the visible light and IR cameras outputs are clear enough (for example there is an adequate signal to nose ratio) for all computer vision functionality.

Processing unit 110 may select the mode of infrared flood illumination when the ambient light in the scene is below the specified threshold. In this mode, the ambient light level is too low and additional IR illumination is required. The flood illumination is carried out by using, for example, a high bright IR flood emitter, to enhance IR lighting and allowing adequate image quality. As explained above, as most of the light in this mode is IR, the visible light and IR cameras output is IR biased.

Processing unit 110 may select the mode of pattern illumination when featureless surfaces in the scene are detected beyond a predefined level. In this mode, the ambient light level is sufficient but the scene includes flat surfaces which require pattern illumination. In this mode, a high bright IR emitter with a pattern mask is activated, to enhance IR lighting as well as support depth-map functionality. The pattern projected on the scene supports the extraction of three-dimensional information from the captured stereoscopic images. Pattern illumination shall be used (if at all) in a relatively low duty cycle.

Additionally, processing unit 110 may select a forth mode of illumination, which may be a combination of the infrared flood illumination mode and the of pattern illumination mode, where both flood IR light and patterned IR light are modulated simultaneously to enhance ambient light and overcome the challenges derived from flat surfaces. This may be implemented using time division multiplexing of the infrared flood illumination mode and the of pattern illumination mode. All Illumination driving circuitry may be managed by the processing unit 110. Discrete and power elements (Inductors, MOSFETs, sense resistors, diodes) may be placed outside processing unit 110. Illuminator 130 may include an array of infrared emitters which may be used with a specified optical mask. Additionally, system 100 may include a multi-switch setup (shown with reference to FIG. 5), enabling operation of only part of the array at any given moment, thus modulating the illumination.

Processing unit 110 may control both duty cycle and current of the current source (not shown). By a combined controlling of both duty cycle and current of the current source processing unit 110 may optimize power consumption per given system requirements.

The at least one audio capturing devices 120 may include a microphone configured to capture audio from the scene surroundings. The at least one audio capturing devices 120 with their respective ADC 122 may have audio channels managed by processing unit 110. The at least one audio capturing devices 120 may include an array of microphones to support phased array audio beam steering so that a directional microphone is being implemented thus providing spatial data associated with the audio capture from the scene.

The captures audio data may be processed and enhanced by the processing unit 110. Such enhancement may include noise reduction, three-dimensional audio beam steering synchronization with video and other functions implemented by processing unit 110. The captured audio may alternatively be routed directly to a bus such as a USB3.0 interface.

Figure 4:
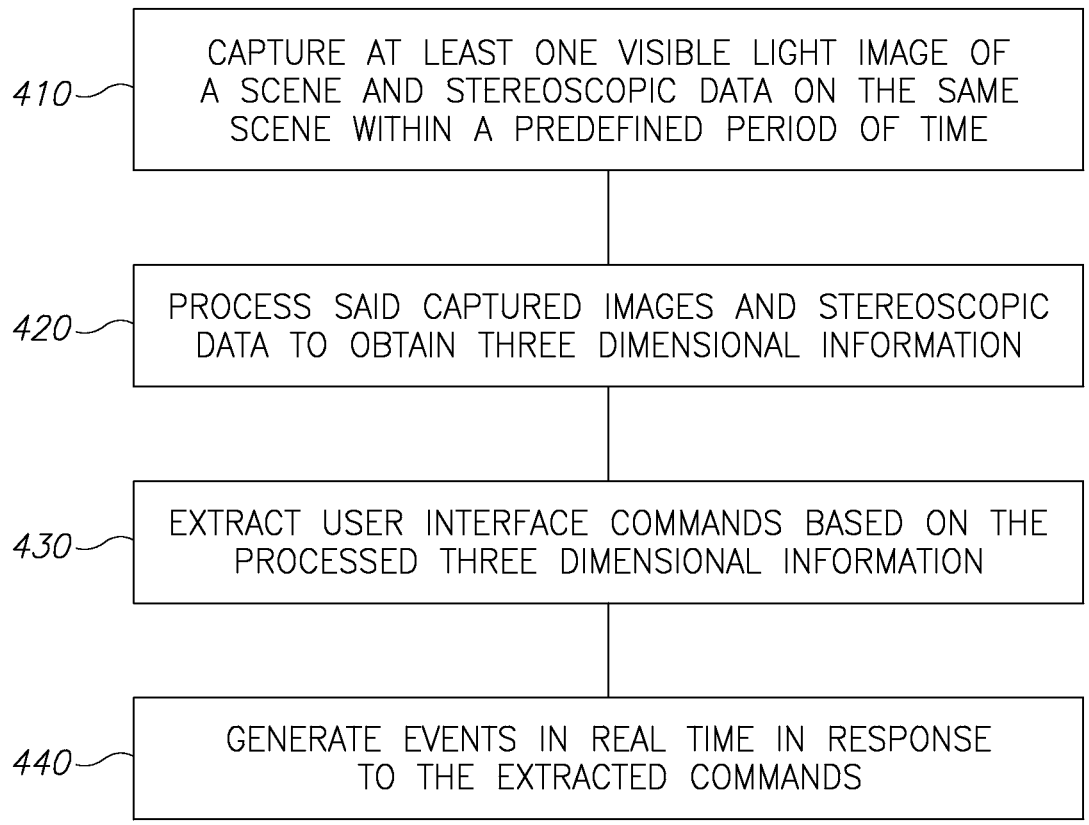
FIG. 4 is a high level flowchart illustrating an aspect according to some embodiments of the invention.

FIG. 4 is a high level flowchart illustrating an exemplary method 400 for providing a natural user interface according to some embodiments of the invention. As indicated in block 410, the method may include capturing at least one visible light image of a scene and three-dimensional data on the same scene within a predefined period of time. The capturing may be performed by a plurality of sensors, comprising at least one visible light imaging device. As discussed herein, the method may further include capturing audio from the scene surroundings, wherein the plurality of sensors further includes an audio capturing device. The method may further include providing spatial data associated with the audio capture from the scene by phased array audio beam steering supported by an array of microphones to implement a directional microphone. As further discussed, in some embodiments, the data capturing may include, for example, capturing of infrared stereoscopic images of a scene from at least two different spatial locations, wherein the plurality of sensors further includes two or more infrared imaging devices. The capturing of the at least one visible light image and the three-dimensional data may be performed simultaneously by the plurality of sensors.

As indicated in block 420, the method may include processing the captured images and three-dimensional data to obtain three-dimensional information such as, for example, natural user interface features information. As discussed herein, the obtained natural user interface features may be obtained by natural user interface functionalities of processing unit 110, comprising at least one of: finger tracking, gesture recognition, head tracking, gaze detection, face recognition, expression recognition, face reconstruction, speech detection, speech recognition, and depth map generation.

The method may include accumulating data captured by the sensors and processed repeatedly, until a user interface feature is obtainable. The capturing and processing of blocks 410 and 420 may be performed repeatedly, for example to process data streaming that have been acquired from the plurality of sensors. By this repeating process the three-dimensional information may be accumulated, for example in memory 12, until a user interface feature may be obtained by any of the natural user interface functionalities. The accumulated information may be stored in the memory of processing unit 110, such as memory 12 described herein.

Further according to embodiments of the present invention, the method may include simultaneously collecting data from the sensors and processing of the collected data, the simultaneous collecting and processing may be enabled, for example, by a memory comprised in the integrated circuit.

As indicated in block 430, the method may include extracting user interface commands based on the obtained three-dimensional information. As discussed herein, the extracting of the user interface commands in real time may be performed by processing unit 110 synchronously with external information sources and/or processing activities.

As indicated in block 440, the method may include generating events in real time in response to the extracted commands. The processing, extracting and generating may be performed simultaneously by autonomous processing unit 110 for natural user interface processing, as described in detail herein. Additionally, the method may include transferring of data from autonomous processing unit 110 to host processor 170, wherein the autonomous processing unit may be embedded in host processor 170, to perform some of the user interface processing.

As described herein, the method may further include, for example before the capturing of the at least one visible light image of a scene and/or the stereoscopic/three-dimensional data, illuminating the scene at a mode of illumination determined by processing unit 110 based on level of ambient light and level of featureless surfaces in the scene as presented in the captured images, wherein the determined mode of illumination may be selected from: a mode of no illumination, a mode of infrared flood illumination, and a mode of pattern illumination. As described in detail herein above, processing unit 110 may select the mode of no illumination when the ambient light in the scene is beyond a specified threshold, the mode of infrared flood illumination when the ambient light in the scene is below the specified threshold, and the mode of pattern illumination when featureless surfaces in the scene are detected beyond a pre-defined level. The method may further include, as described above, modulating the illumination by operating only part of an array of infrared emitters at any given moment, wherein the array of infrared emitters being used with a specified optical mask.

The method may further include, as described herein, synchronization of at least two or all operations of a list comprising: the sensor operation, the data acquiring, the obtaining of the three-dimensional information and/or the extraction on the NUI features. The synchronization may further include assigning time tag to any data that is transmitted through processing elements such as, for example the processing unit 110 elements or to the host processor 170.

Figure 5:
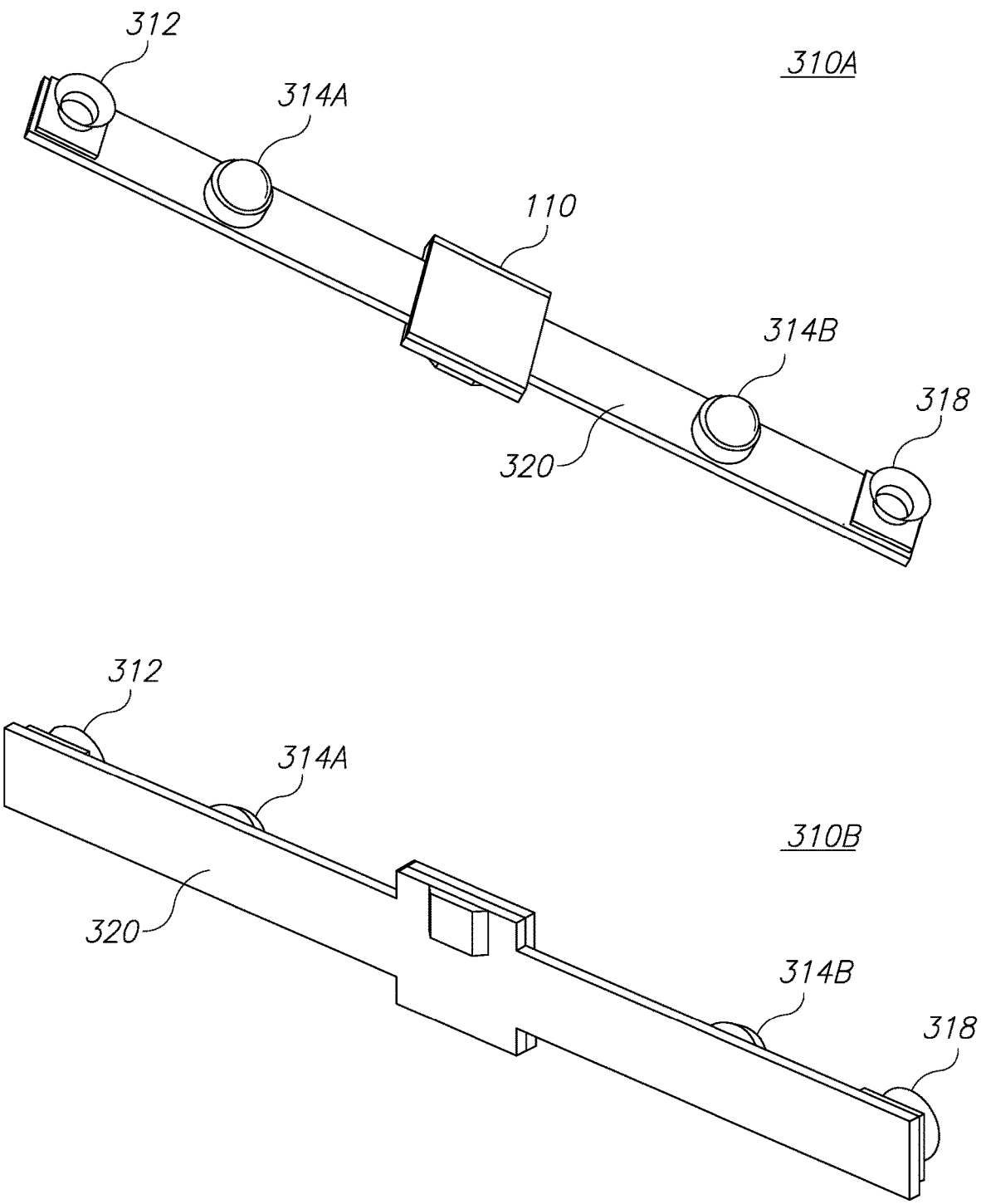
FIG. 5 shows perspective views of an exemplary packaging of the system according to some embodiments of the invention.

FIG. 5 shows perspective views 310A and 310B of an exemplary packaging 320 of the system according to some embodiments of the invention. Two CMOS cameras 312 and 318 that may be RGB and IR sensitive cameras as discussed in detail above, may be arranged in a stereoscopic setting. The two cameras may be located on the adjacent ends of packaging 320. These two cameras 312 and 318 may serve as the base of a stereoscopic source for depth map generation. They may also serve for gaze vector detection data generation. Both cameras may be controlled by a processing unit 110.

Additionally, two IR emitters 314A and 314B with dedicated switched current drivers may be deployed, for example for the purpose of IR illumination. As explained above, one of IR emitters 314A and 314B may be used for IR flooding to overcome low ambient light scenarios; and the second IR emitter may be used for pattern projection to support depth map extraction from the stereoscopic RGB/IR cameras. The IR emitters may be driven individually by two respective current switches. The switched current drivers may be controlled by processing unit 110. All power-related current switch elements (inductors, MOSFETs and the like) may be external discrete components.

Another camera or more (not shown), which may be an RGB standard webcam, may serve as a standard web cam such as 1.3M pixel camera. This camera may also be controlled by processing unit 110. Given the computation power of processing unit 110, it may serve for various images enhancement functions on the web cam output. Alternatively, processing unit 110 may serve as a mere pipeline—relaying the camera output directly to a host processor as described herein, with no data processing whatsoever or with only partial data processing. There may also be provided a connector (not shown) to a host processor that may serve as an interface.

An audio channel of one or more microphones (not shown) with their respective Analog to Digital converters may also be controlled and managed by processing unit 110. An array of microphones may be implemented, to support phased array audio beam steering. The sampled audio information may be processed and enhanced by processing unit 110. Alternatively, processing unit 110 may serve as a mere pipeline, relaying the ADCs outputs directly to a host processor, with no data processing or with only partial data processing.

Figure 6:
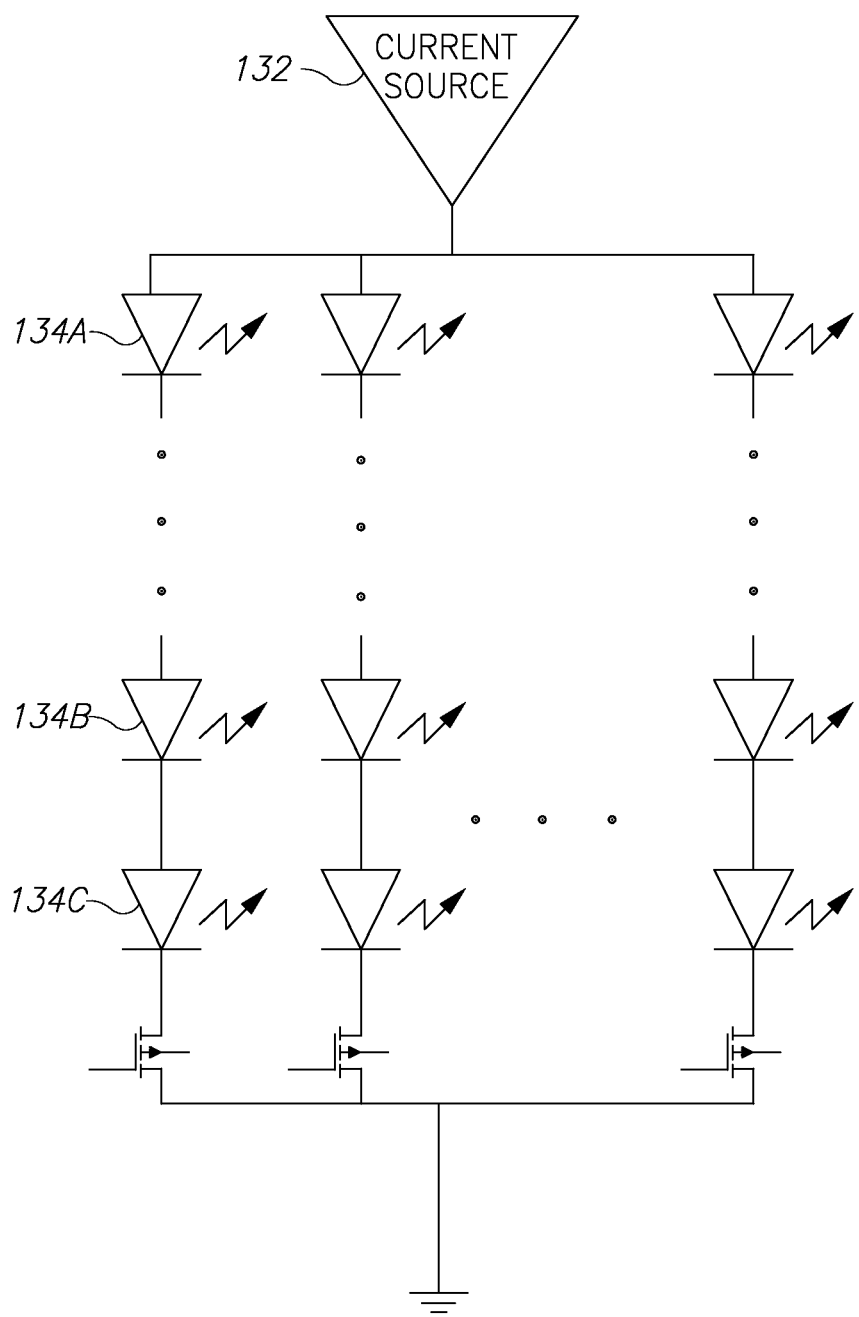
FIG. 6 is a circuit diagram illustrating an exemplary feature according to some embodiments of the invention.

FIG. 6 is a circuit diagram illustrating an exemplary feature according to some embodiments of the invention. An IR illumination source is used for pattern projection. IR Pattern projection is required occasionally, to support 3D data extraction from stereoscopic imaging. Specifically, it is used when large areas in the image lack texture or other types of data required for registration.

For pattern illumination, an array of IR emitters' 134A-C is being used with a special optical mask in front of it. A multi-switch setup allows controlled by current source 132 enables to light only part of the array at any given moment, thus spatially modulating the illumination. The illumination modulation, combined with the optical mask provides the processing unit 110 with several variations of pattern projection that may be used on a per case basis.

Figure 7:
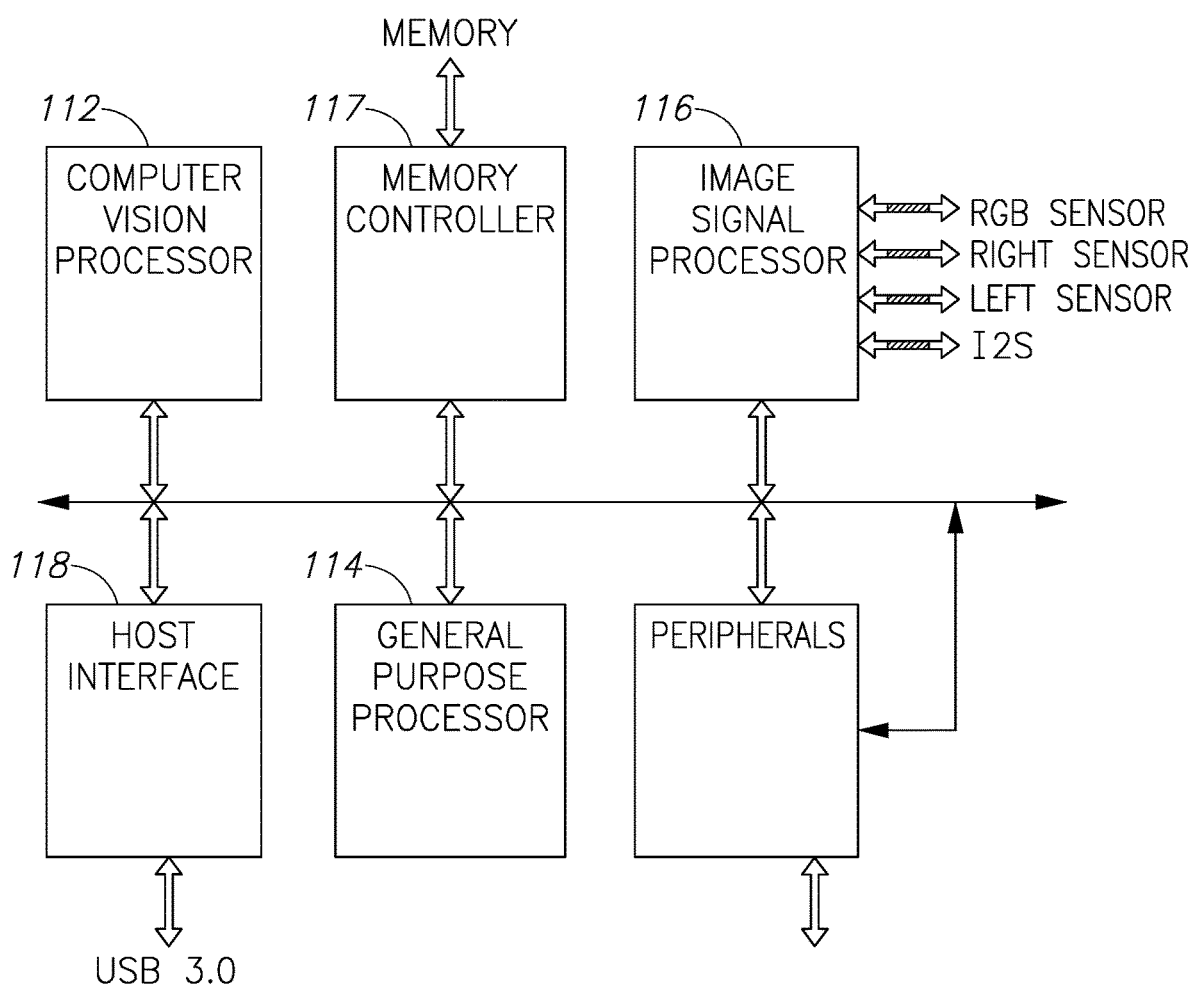
FIG. 7 is a high level schematic block diagram illustrating in further details the exemplary system according to some embodiments of the invention.

FIG. 7 is a high level schematic block diagram illustrating in further details the exemplary system according to some embodiments of the invention. The processing unit 110 may be, for example, a multi-core Application Specific Integrated Circuit (ASIC). It is designed as a dedicated processor, to support NUI-related functionality.

The top-level functionality of processing unit 110 is as follows: first of all, processing unit 110 is configured to command and control all peripheral sensors. Second, processing unit 110 is configured to process all Sensors outputs and generate NUI related information; and finally, processing unit 110 may be configured to interface a host processor as a USB3.0 device, and relay to it all or some of the processed data.

Processing unit 110 may include three primary processors: computer vision processor 112, general purpose processor 114 and image signal processor 116 operate in parallel, which may share the computational tasks. An on-chip SRAM memory may also be available. In addition, a memory controller may interface processing unit 110 to an external DDR memory. Additionally, a host interface may 118 serve as a USB3.0 device, interfacing processing unit 110 to the host processor.

Following is a more detailed, non-limiting explanation of the architecture of processing unit 110. Starting with image signal processor 116, this module may be a combination of Hardware accelerator and Software core. The key functionalities of image signal processor 116 may include: (1) driving, controlling and managing the visible and IR image sensors of the system via parallel or MIPI interface; (2) driving, controlling and managing all Audio Analog to Digital converters via I2S interface; and (3) generating depth/three-dimensional information and deriving depth map from it.

Referring now to computer vision processor 112, this module may be software based processor, aimed to perform computer vision functions. The core may be implemented, in a non-limiting embodiment as one or more CEVA MM3101. The key functionalities of computer vision processor 112 may include: gesture recognition, gaze detection, face recognition, image enhancement, and the like.

Finally referring to general purpose processor (GPP) 114, this module may be software based processor.

Focusing now on the data flow in processing unit 110, all or some of the sensors may be controlled and managed by image signal processor 116. Data generated by the sensors may be received by image signal processor 116. The RGB/IR cameras data may be used to generate three-dimensional and depth map information. The three-dimensional information and depth map may be generated by image signal processor 116. In some embodiments, some or all of the RGB/IR cameras, depth, audio and natural user interface data can be routed directly to a USB3.0 via a host interface. Alternatively, some or all of the data can be routed to computer vision processor 112, where image enhancement functions can be executed.

Additionally, the audio data can go through a voice enhancement and noise suppression phase in computer vision processor 112. The depth map and/or disparity information arrive to computer vision processor 112. Computer vision processor 112 performs some computer vision functions, as described above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system on an integrated circuit comprising:
   a plurality of defined data processing dedicated areas configured to perform computational functions relating to a corresponding plurality of natural user interface features, to obtain said plurality of user interface features based on scene features detected by a plurality of sensors within a defined period of time;
   a central processing unit configured to carry out software instructions to support the computational functions of said dedicated areas; and
   at least one defined area for synchronized data management, configured to receive signals corresponding to detected scene features from said plurality of sensors, to route said signals to suitable dedicated areas of said plurality of dedicated areas and the central processing unit to provide real-time acquiring of user interface features, synchronize the plurality of sensors to generate corresponding signals according to specific timing, coordinate the timing of operations between suitable dedicated areas and the central processing unit, and assign a time tag to data that is transmitted through dedicated areas to enable synchronization.

2. The system according to claim 1, wherein the processing unit is further configured to individually control devices included in the plurality of sensors.

3. The system according to claim 1, wherein said integrated circuit is embedded in a host processor and wherein data is transferred from said integrated circuit to said host processor to perform some of the user interface processing.

4. The system according to claim 1, wherein the synchronized data management is further to coordinate between said plurality of dedicated areas and said central processing unit.

5. The system of claim 1, wherein at least one of said dedicated areas and/or the central processing unit is to extract user interface commands based on the user interface features.

6. The system of claim 5, wherein said central processing unit is to generate events in real time in response to the extracted commands.

7. The system according to claim 5, wherein the processing unit is configured to extract said user interface commands in real time synchronously with external information sources and/or processing activities.

8. The system of claim 1, wherein said plurality of sensors is configured to detect scene features simultaneously.

9. The system of claim 1, wherein said plurality of sensors comprises sensors configured to capture stereoscopic, three-dimensional and/or depth/distance data.

10. The system of claim 1, wherein said plurality of sensors comprises at least one of a list comprising: visible light imaging device, depth sensors, stereoscopically calibrated infrared capturing devices, audio capturing device, laser scanners, time-of flight cameras, ultrasonic sensors and/or any other suitable sensor/device.

11. The system of claim 1, wherein at least one of said dedicated areas is to obtain three-dimensional information about the scene.

12. The system of claim 1, wherein at least one of said dedicated areas and/or the central processing unit is to optically align and/or correlate visible light and corresponding three-dimensional information.

13. The system according to claim 1, wherein the computational functions relating to a corresponding plurality of natural user interface features are of a list comprising at least one of: finger tracking, gesture recognition, head tracking, gaze detection, face recognition, expression recognition, face reconstruction, speech detection, speech recognition, and depth map generation.

14. The system according to claim 1, wherein said plurality of sensors comprises two or more infrared imaging devices configured to capture infrared stereoscopic images of the scene from at least two different spatial locations.

15. The system according to claim 14, further comprising an illuminator configured to illuminate the scene at a mode of illumination determined by said processing unit based on level of ambient light and level of featureless surfaces in the scene as presented in captured images of the scene, wherein the determined mode of illumination is selected from: a mode of no illumination, a mode of infrared flood illumination, and a mode of pattern illumination.

16. The system according to claim 15, wherein said processing unit is to select the mode of no illumination when the ambient light in the scene is beyond a specified threshold, to select the mode of infrared flood illumination when the ambient light in the scene is below the specified threshold, and to select the mode of pattern illumination when featureless surfaces in the scene are detected beyond a predefined level.

17. The system according to claim 15, wherein the illuminator comprises an array of infrared emitters being used with a specified optical mask, and further comprising a multi-switch setup enabling operation of only part of the array at any given moment, thus modulating the illumination.

18. The system according to claim 1, providing at least one operation of a list comprising: extraction of data, correlation between sensors inputs, acquiring of user interface features, generation of events and correlation between events and/or events interactions in less than 50 msec.

19. A natural user interface method for processing natural user interface by a dedicated integrated circuit comprising a plurality of defined data processing dedicated areas, a central processing unit configured to carry out software instructions and at least one defined area for synchronized data management, the method comprising:

receiving signals generated by a plurality of sensors, the signals corresponding to scene features detected by said plurality of sensors within a defined period of time;

routing said generated signals by said at least one synchronized data management area to suitable dedicated areas of said plurality of dedicated areas and the central processing unit to provide real-time acquiring of natural user interface features;

synchronizing the plurality of sensors to generate corresponding signals according to specific timing;

coordinating the timing of operations between suitable dedicated areas and the central processing unit;

assigning a time tag to data that is transmitted through dedicated areas to enable synchronization; and performing by the plurality of dedicated areas computational functions relating to a corresponding plurality of natural user interface features, to obtain said plurality of user interface features based on said detected scene features, wherein said acquiring of user interface features by the computational functions of said dedicated areas is supported by said central processing unit.

\* \* \* \* \*